US010132619B2

(12) United States Patent
Nomaru et al.

(10) Patent No.: US 10,132,619 B2
(45) Date of Patent: Nov. 20, 2018

(54) SPOT SHAPE DETECTION APPARATUS

(71) Applicant: DISCO CORPORATION, Tokyo (JP)

(72) Inventors: Keiji Nomaru, Tokyo (JP); Arata Osaki, Tokyo (JP); Akimasa Nakamoto, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 15/878,178

(22) Filed: Jan. 23, 2018

(65) Prior Publication Data

US 2018/0209783 A1 Jul. 26, 2018

(30) Foreign Application Priority Data

Jan. 24, 2017 (JP) ................. 2017-010376

(51) Int. Cl.
| | |
|---|---|
| *G01J 1/00* | (2006.01) |
| *G01B 11/24* | (2006.01) |
| *G01J 1/42* | (2006.01) |
| *G01J 1/04* | (2006.01) |

(52) U.S. Cl.
CPC .............. *G01B 11/24* (2013.01); *G01J 1/044* (2013.01); *G01J 1/0411* (2013.01); *G01J 1/0418* (2013.01); *G01J 1/4257* (2013.01)

(58) Field of Classification Search
CPC ....... G01B 11/24; G01J 1/0411; G01J 1/0418; G01J 1/044; G01J 1/4257
USPC ....................................................... 356/122
See application file for complete search history.

(56) References Cited

U.S. PATENT DOCUMENTS

| 8,431,861 B2* | 4/2013 | Sawabe | B23K 26/03 |
| | | | 219/121.83 |
| 2008/0218751 A1* | 9/2008 | Togashi | G01N 21/4738 |
| | | | 356/237.5 |
| 2013/0027690 A1* | 1/2013 | Nomaru | G01J 1/4257 |
| | | | 356/121 |

FOREIGN PATENT DOCUMENTS

| JP | 10-305420 | 11/1998 |
| JP | 2002-192370 A | 7/2002 |
| JP | 2013-22634 A | 2/2013 |
| JP | 2013-527979 A | 7/2013 |
| JP | 2013-151002 A | 8/2013 |

* cited by examiner

*Primary Examiner* — Sunghee Y Gray
(74) *Attorney, Agent, or Firm* — Greer Burns & Crain, Ltd.

(57) ABSTRACT

A spot shape detection apparatus for detecting the spot shape of a laser beam oscillated from a laser oscillator includes: a focusing leans for focusing the laser beam oscillated by the oscillator; a rotary body (mirror holder) in which a plurality of mirrors for reflecting the laser beam having passed through the focusing lens are disposed on concentric circles; a drive source (motor) for rotating the rotary body at a predetermined period; a beam splitter for branching return beams of the laser beam reflected by the plurality of mirrors of the rotary body; an imaging unit which is disposed in a direction in which the return beams are branched by the beam splitter and which images spot shapes of the return beams; and a display unit for displaying images obtained by imaging by the imaging unit, in relation with the plurality of mirrors.

4 Claims, 3 Drawing Sheets

SPOT SHAPE DETECTION APPARATUS

BACKGROUND OF THE INVENTION

Field of the Invention

The present invention relates to a spot shape detection apparatus capable of detecting an accurate spot shape of a laser beam.

Description of the Related Art

A wafer having a plurality of devices such as integrated circuits (ICs), large-scale integrations (LSIs), or light emitting diodes (LEDs) formed on its front surface partitioned by division lines (streets) is divided into individual devices by a laser processing apparatus for performing ablation by applying to the division lines a laser beam of such a wavelength as to be absorbed in the wafer, and the devices are used for electric apparatuses such as mobile phones, personal computers, liquid crystal television (TV) sets, illumination apparatuses and the like (see, for example, Japanese Patent Laid-Open No. 1998-305420).

In addition, there has also been proposed a laser processing technology in which a laser beam of such a wavelength as to be transmitted through a wafer is applied to the wafer along division lines, with the focal point of the laser beam positioned inside the wafer, to form modified layers along the division lines, and an external force is exerted on the wafer to divide the wafer into individual devices, and this technology is put to practical use in the field of laser processing apparatus (see, for example, Japanese Patent No. 3408805).

Besides, the spot shape of the laser beam oscillated by a laser oscillator constituting the above-mentioned laser processing apparatus has an influence on the quality of processing. In order to secure quality upon laser processing, therefore, the laser beam should be evaluated either by use of the spot shape of the laser beam applied to the wafer or by calculating an M2 factor, which is an index for evaluating the laser beam on the basis of the beam diameter calculated from the spot shape. Heretofore, some apparatuses for detecting a spot shape have been proposed (see, for example, Japanese Patent Laid-Open No. 2013-022634, Japanese Patent Laid-Open No. 2013-151002, and Japanese Patent No. 5726999). Note that the M2 factor is an index value indicative of how many times the beam diameter obtained when a laser beam is focused and converged to a diffraction limit is as large as the beam diameter obtained when an ideal Gaussian beam is converged to a diffraction limit. Therefore, the index value is represented by a ratio of not less than 1 (one) to the ideal Gaussian beam, and the M2 factor in the case where the laser beam coincides with an ideal Gaussian beam is 1 (one).

SUMMARY OF THE INVENTION

For evaluating a laser beam by detecting the spot shape as aforementioned, it is necessary to perform detection of spot shape at multiple points or evaluation of the M2 factor grasped based on spot diameter or the like. The detection of spot shape requires comparatively much time, which leads to poor productivity. In addition, there is a problem as to the reproducibility of the spot shape detected. Thus, there is a problem in securing accurateness of evaluation.

It is therefore an object of the present invention to provide a spot shape detection apparatus for detecting, efficiently in a short time, an accurate spot shape of a laser beam applied from a laser oscillator.

In accordance with an aspect of the present invention, there is provided a spot shape detection apparatus for detecting a spot shape of a laser beam oscillated by a laser oscillator, the spot shape detection apparatus including: a focusing lens for focusing the laser beam oscillated by the laser oscillator; a rotary body in which a plurality of mirrors for reflecting the laser beam having passed through the focusing lens are disposed on concentric circles; a drive source for rotating the rotary body at a predetermined period; a beam splitter for branching return beams of the laser beam reflected by the plurality of mirrors of the rotary body; an imaging unit which is disposed in a direction in which the return beams are branched by the beam splitter and which images spot shapes of the return beams; and a display unit for displaying images obtained by imaging by the imaging unit, in relation with the plurality of mirrors, wherein the plurality of mirrors are disposed in the rotary body in such a manner that when the rotary body is rotated in a predetermined direction, focal points of the return beams of the laser beam reflected sequentially by the plurality of mirrors gradually approach an imaging position of the imaging unit, reach the imaging position and gradually come farther from the imaging position.

In the aforementioned aspect of the present invention, a shutter of the imaging unit may be operated synchronously with the timing of reflection of the laser beam by each mirror of the rotary body. In addition, the brightness of the return beam of the laser beam captured by the imaging unit may be controlled by regulating the timing of opening of the shutter of the imaging unit, in a condition where the time when the laser beam is being applied to and reflected by each mirror is the longest. Further, an attenuating filter may be disposed in front of the focusing lens.

The spot shape detection apparatus of the present invention includes: a focusing lens for focusing the laser beam oscillated by the laser oscillator; a rotary body in which a plurality of mirrors for reflecting the laser beam having passed through the focusing lens are disposed on concentric circles; a drive source for rotating the rotary body at a predetermined period; a beam splitter for branching return beams of the laser beam reflected by the plurality of mirrors of the rotary body; an imaging unit which is disposed in a direction in which the return beams are branched by the beam splitter and which images spot shapes of the return beams; and a display unit for displaying images obtained by imaging by the imaging unit, in relation with the plurality of mirrors, wherein the plurality of mirrors are disposed in the rotary body in such a manner that when the rotary body is rotated in a predetermined direction, focal points of the return beams of the laser beam reflected sequentially by the plurality of mirrors gradually approach an imaging position of the imaging unit, reach the imaging position and gradually come farther from the imaging position. Therefore, the spot shapes of beam spots formed in a region in the vicinity of the focal point of the laser beam can be easily detected and displayed on the display unit. More specifically, for example, in the case where the number of the mirrors constituting the rotary body is seventeen and 50 images can be picked up in one second, the spot shapes in the regions on both sides of the focal point can be imaged and displayed on the display unit in 0.34 seconds. Furthermore, when the spot diameter is determined using the spot shapes thus imaged, evaluation of beam profile such as the M2 factor can be easily carried out.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

A spot shape detection apparatus according to an embodiment of the present invention will be described more in detail below, referring to the attached drawings.

Figure 1:
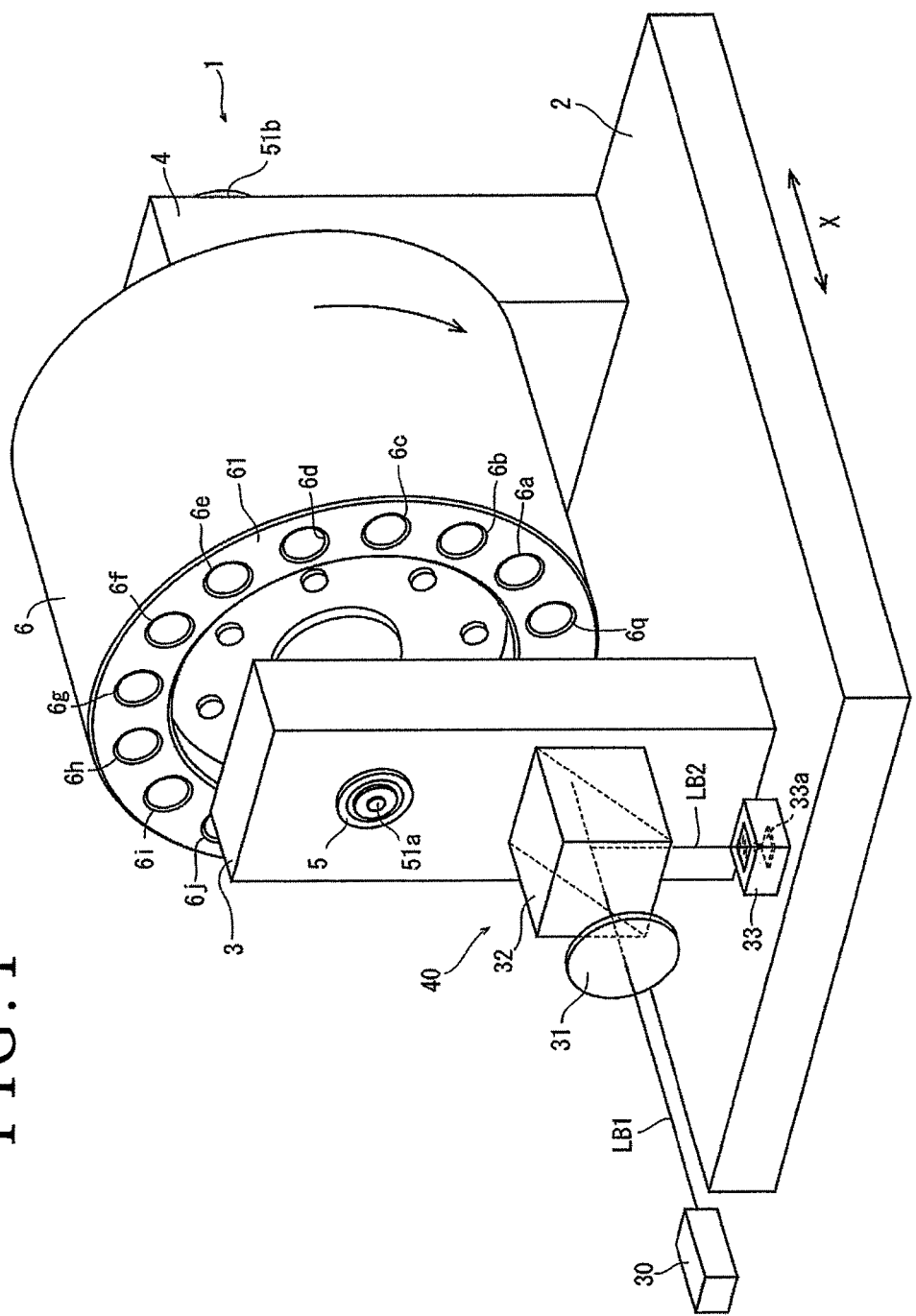
FIG. 1 is a general perspective view of a spot shape detection apparatus.
Figure 2:
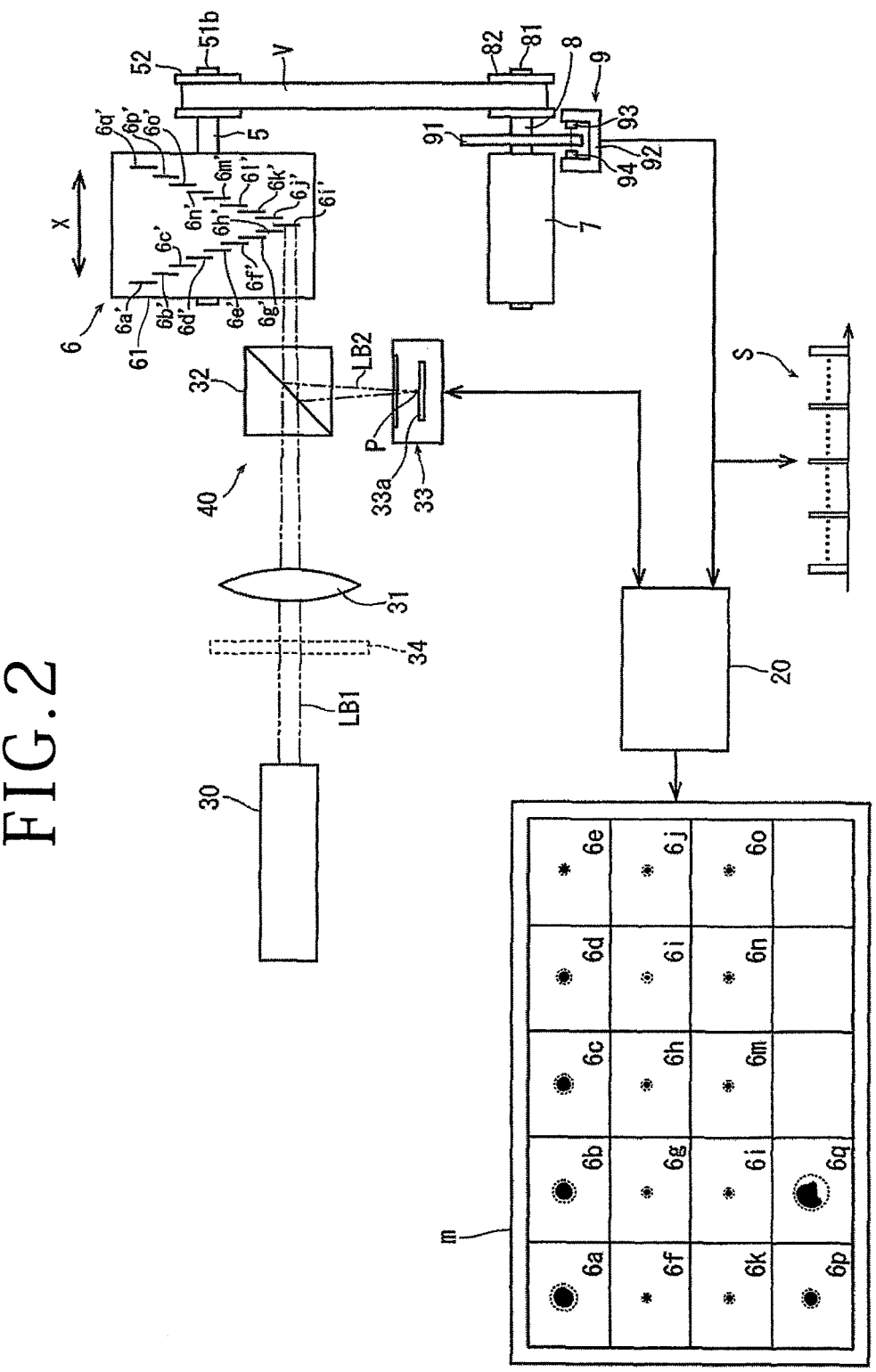
FIG. 2 is a block diagram for explaining optical means of the spot shape detection apparatus depicted in FIG. 1.

FIGS. 1 and 2 depict an embodiment of the spot shape detection apparatus. The spot shape detection apparatus 1 of the present embodiment includes: a base 2 on which major sections of the spot shape detection apparatus 1 are mounted; a cylindrical rotary body (hereinafter referred to as "the mirror holder 6") in which a plurality (in the present embodiment, seventeen) of reflection holes 6a to 6q each with a mirror incorporated therein are disposed on concentric circles; a rotary shaft 5 constituting a center shaft of the mirror holder 6 and penetrating the mirror holder 6; and support frames 3 and 4 which support a front end portion 51a and a rear end portion 51b of the rotary shaft 5 and which are erected on the base 2. Note that though not illustrated in FIG. 1, the spot shape detection apparatus of the present embodiment is provided with a motor as a drive source for rotationally driving the mirror holder 6 at a predetermined period, and an encoder annexed to the motor, the details of which will be described later.

In the mirror holder 6, the plurality of reflection holes 6a to 6q bored in an axial direction are provided in this order along a counterclockwise direction, the reflection holes 6a to 6q being disposed at a predetermined interval on the same circumference of circle with the rotary shaft 5 as a center. As schematically depicted in FIG. 2, mirrors 6a' to 6q' for reflecting a laser beam incident from the outside are incorporated in the reflection holes 6a to 6q, the mirrors 6a' to 6q' being positioned and fixed so that their distances in a direction indicated by arrow X from one end surface 61 of the mirror holder 6 are different from one another. The position at which each of the mirrors 6a' to 6q' is disposed and operations or effects based on the position will be described later. Note that though the reflection holes 6k to 6p are not depicted in FIG. 1, the reflection holes 6k to 6p are disposed behind the support frame 3 in the figure, and are disposed in the mirror holder 6 at the same interval as that of the other reflection holes.

As depicted in FIG. 2, toothed pulleys 52 and 82 formed with the same number of teeth are fixed to a rear end portion 51b on the support frame 4 side of the rotary shaft 5 penetrating the center of the mirror holder 6, and to a tip portion 81 of a rotary shaft 8 of the motor 7 disposed for rotationally driving the mirror holder 6, respectively. A toothed belt V is arranged around and between the toothed pulleys 52 and 82. By the toothed pulleys 52 and 82 and the toothed belt V, rotation of the motor 7 is transmitted to the rotary shaft 5 of the mirror holder 6 without slipping, and, with the rotational speed of the motor 7 controlled by control means 20 to be described later, the rotational period of the mirror holder 6 can be controlled accurately.

In addition to the above-mentioned configuration, optical means 40 for detecting a spot shape is disposed in the spot shape detection apparatus 1 of the present embodiment, as specifically depicted in FIG. 2. The optical means 40 includes, for example, a laser oscillator 30 as an object to be evaluated; a focusing lens 31 for focusing a laser beam LB1 oscillated by the laser oscillator 30; a beam splitter 32 which applies the laser beam LB1 having passed through the focusing lens 31 onto a circumference of circle of the mirror holder 6 formed with the reflection holes 6a to 6q and which reflects return beams LB2 reflected by the mirrors 6a' to 6q' disposed inside the reflection holes 6a to 6q to change the optical path of the return beams LB2 toward the lower side; and imaging means (imaging unit) 33 which is disposed on the optical path of the return beams LB2 reflected by the beam splitter 32 and which incorporates therein an imaging element 33a for imaging the spot shapes of the return beams LB2. Note that the support frame 3 is formed with an opening (not depicted) for guiding the laser beam LB1 toward the mirror holder 6 side through the beam splitter 32. Note that though not depicted in FIG. 1, as indicated by dotted line in the optical means in FIG. 2, output control means for controlling the laser beam LB1 to an output suitable for imaging the spot diameter by the imaging means 33 may be provided between the laser oscillator 30 and the focusing lens 31, and a light attenuating filter 34 may be disposed as the output control means.

Figure 3:
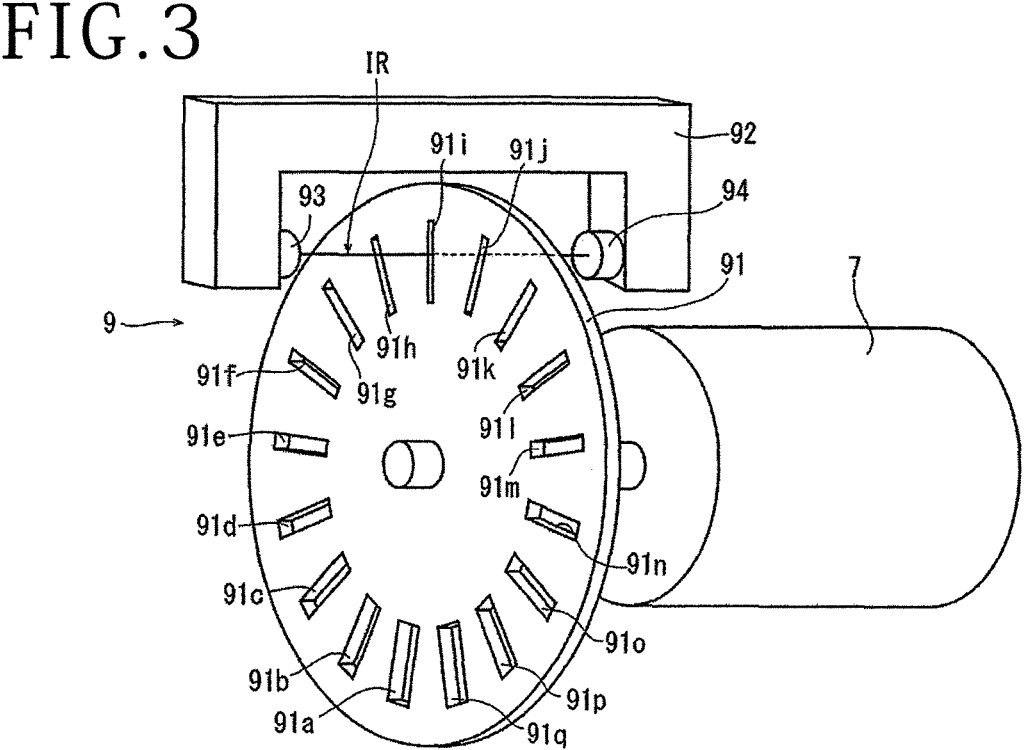
FIG. 3 is a schematic view of an encoder of the spot shape detection apparatus depicted in FIG. 1.

Here, the encoder 9 annexed to the motor 7 for rotationally driving the mirror holder 6 will be described referring to FIGS. 2 and 3. As depicted in FIGS. 2 and 3, the encoder 9 in the present embodiment includes a rotary wheel 91 disposed on the rotary shaft 8 of the motor 7, and a trigger generator 92 disposed on opposite sides of a peripheral portion of the rotary wheel 91. As depicted in the figures, the trigger generator 92 is provided with a light emitting element 93 for emitting infrared (IR) light, for example, and a light receiving element 94 for receiving IR light, which are disposed on opposite sides of the rotary wheel 91. When the rotary wheel 91 is rotated and infrared light emitted from the light emitting element 93 passes through slits 91a to 91q formed at regular intervals in a peripheral portion of the rotary wheel 91 and is received by the light emitting element 94, a trigger signal S as depicted on the lower side in FIG. 2 is outputted, and the signal is sent to the control means 20. Here, the opening widths of the slits 91a to 91q disposed in the rotary wheel 91 are so set as to be narrowest at the slit 91i and to become wider as going farther from the slit 91i. Specifically, the signal width (the length of time when the signal is ON) of the trigger signal S is the smallest (shortest) at the slits 91f to 91l, and the largest (longest) on the side of the slits 91a and 91q. A control is performed such that when the trigger signal S is transmitted to the control means 20, a shutter (not depicted) of the imaging means 33 is opened synchronously with the trigger signal S. Note that in the present embodiment, by controlling the rotational speed of the motor 7, as viewed clockwise, the time when the shutter is made to be ON by the slits 91f to 91l is set to be one millisecond, the time when the shutter is made to be ON by the slits 91c to 91e and 91m to 91o is set to be two milliseconds, and the time when the shutter is made to be ON by the slits 91p to 91b is set to be five milliseconds.

The control means 20 is formed of a computer, including a central processing unit (CPU) for performing arithmetic operations according to a control program, a read only memory (ROM) for storing the control program and the like, a writable-and-readable random access memory (RAM) for temporarily storing detected values, the results of operations and the like, an input interface and an output interface (details are omitted from the drawing). Not only the signal from the trigger generator 92 but also image data or the like sent from the imaging means 33 is inputted to the control means 20, the imaging data is stored in the random access memory (RAM), and is displayed, as required, on display means (display unit) m disposed in the vicinity of the spot shape detection apparatus 1.

The layout positions of the mirrors 6a' to 6q' disposed inside the reflection holes 6a to 6q of the mirror holder 6 will be described. One mirror for reflecting the laser beam is disposed in each of the reflection holes 6a to 6q, and the layout positions of the mirrors 6a' to 6q' are so set that they are different from one another in the direction indicated by arrow X in FIG. 2. For convenience of explanation, the mirror holder 6 depicted in the figure is depicted in a see-through state as the positions of the mirrors disposed in the mirror holder 6 are viewed from a lateral side. As is clear from the figure, the mirror 6a' is disposed on the side of one end surface 61 of the mirror holder 6 so that its distance from the one end surface 61 is the shortest, the mirror 6b', the mirror 6c' and so on are disposed with the distance from the one end surface 61 being increased, and the mirror 6q' is disposed at the deepest position in the reflection hole.

The layout positions of the mirrors 6a' to 6q' will be described more specifically. As aforementioned, the laser beam LB1 oscillated by the laser oscillator 30 is focused through the focusing lens 31, and is reflected by each of the mirrors 6a' to 6q' to be the return beam LB2, which is reflected by the beam splitter 32, to be guided to the imaging means 33. Here, the position of the mirror 6i located at a middle position in the direction of arrow X in the figure of the mirror holder 6 is so set that the return beam LB2 reflected by the mirror 6i forms a focal point P on the imaging element 33a of the imaging means 33, in other words, that the spot shape imaged by the imaging means 33 is the smallest for the return beam LB2 reflected by the mirror 6i. The focal point P is moved toward the lower side of the imaging element 33a as the mirror position (reflection position) is moved from the mirror 6i toward the side of the one end surface 61 of the mirror holder 6, and the focal position P is moved toward the upper side of the imaging element 33a as the mirror position is moved from the mirror 6i toward the side of spacing away from the one end surface 61 of the mirror holder 6. Besides, with the mirror 6i as a center, the mirrors 6f' to 6l' are disposed at an interval of 1 mm in the direction of arrow X, the mirrors 6c' to 6f' and 6l' to 6o' are disposed at an interval of 5 mm, and the mirrors 6a' to 6c' and 6o' to 6q' are disposed at an interval of 20 mm, such that the spot shape can be imaged more finely in the vicinity of a region where the spot diameter of the laser beam becomes the smallest and reaching a diffraction limit.

The spot shape detection apparatus 1 of the present embodiment is generally configured as above, and its operations or effects will be described below referring to FIG. 2.

For evaluating the quality of a laser beam, the operator prepares the laser oscillator 30 as an object to be evaluated, places it on a predetermined mount base (not depicted) and adjusts the laser beam applying direction. Next, for starting detection of the spot shape, an instruction to start an operation is given to the control means 20, whereon the motor 7 starts rotating, the rotational driving force is transmitted through the toothed pulley 82, the toothed belt V and the toothed pulley 52, and the mirror holder 6 is rotated at a predetermined rotational period.

In a state in which the rotational period of the mirror holder 6 has become stable at a predetermined value, a laser beam of a wavelength of 635 nm, for example, is oscillated at a predetermined output from the laser oscillator 30, and is applied to the focusing lens 31. Further, the rotary wheel 91 of the encoder 9 is rotated together with the rotary shaft 8 of the motor 7, whereby a trigger signal S is outputted as aforementioned. The trigger signal S generated based on the slits 91a to 91q is so set that it becomes ON synchronously with the timing at which the laser beam LB1 is incident on each of the reflection holes 6a to 6q. For example, when the trigger signal S generated based on the slit 91a becomes ON at the timing at which the laser beam LB1 is being reflected by the mirror 6a', the shutter (not depicted) of the imaging means 33 is kept open while the trigger signal S is ON, the spot shape of the return beam LB2 applied to the imaging element 33a is recorded, and is transmitted to and stored in the control means 20. When the mirror holder 6 is rotated further and the return beam LB2 reflected by the mirror 6b' is reaching the imaging means 33, the shutter of the imaging means 33 is opened based on the trigger signal S generated based on the slit 91b, the spot shape of the beam spot formed on the imaging element 33a is imaged, and the imaging data is transmitted to the control means 20. Subsequently, in the same manner, when the return beams LB2 reflected by the mirrors 6c' to 6q' are reaching the imaging means 33, the shutter of the imaging means 33 is opened based on the trigger signal S generated based on the slits 91c to 91q, and the spot shapes of the beam spots formed on the imaging element 33a due to the reflection on the mirrors 6c' to 6q' are recorded in the control means 20.

Note that since the light density of the beam received by the imaging element 33a is higher as the position of the focal point P is nearer to the imaging element 33a, the ON time of the trigger signal S generated by the slits 91a to 91q is set to be shorter, and the ON time is set to be relatively longer as the focal point P is farther from the imaging element 33a, whereby the exposure time is controlled such that damaging of the imaging element 33a is prevented and the spot shape to be imaged is imaged appropriately. The ON time owing to the slits 91a to 91q is effective only while the laser beam LB1 is being reflected by each of the mirrors 6a' to 6q'. Therefore, the time for which the shutter is opened, or the shutter speed, is controlled and the brightness of the spot shape imaged by the imaging means 33 is controlled, in a condition in which the reflection time relevant to each of the mirrors 6a' to 6q' determined by the hole shape of the reflection holes 6a to 6q and the rotational period of the mirror holder 6 is the longest.

When the spot shape of the return beam LB2 reflected by each of the mirrors 6a' to 6q' is imaged and is recorded in the control means 20 in the above-mentioned manner, the imaged spot shapes are displayed in relation with the reflection holes 6a to 6q on the display means m connected to the control means 20 (see FIG. 2).

Simultaneously with the displaying of the imaged spot shapes on the display means m in relation with the reflection holes 6a to 6q, the spot diameters of the spot shapes captured by the imaging means 33 are calculated based on the spot shapes stored in the control means 20. For the calculation of the spot diameter, there is used D4σ, which is determined based on the image picked up by the imaging means 33. The D4σ is defined as four times the standard deviation a of intensity distribution, is defined by International Organization for Standardization (ISO) international standard as a technique for determining the beam diameter of a laser beam, and the details thereof are known; therefore, the description thereof is omitted here. When the spot diameters of the return beams LB2 reflected by the mirrors 6a' to 6q' are detected using the D4σ, the spot diameters are stored in the control means 20 in relation with the mirrors 6a' to 6q'.

Figure 4:
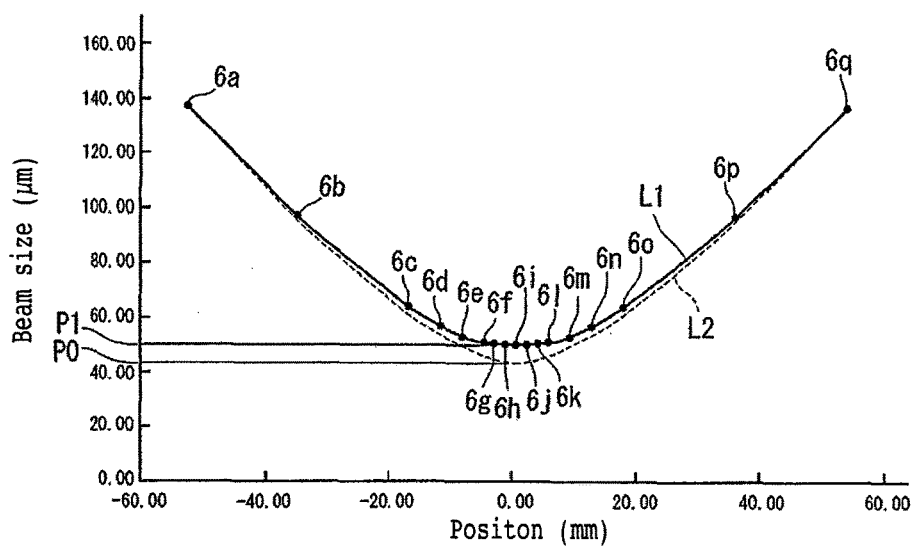
FIG. 4 is a graph depicting a relation between the spot diameter detected by the spot shape detection apparatus depicted in FIG. 1 and the position where a mirror is disposed.

In FIG. 4, the spot diameter d (μm) of the spot formed on the imaging element 33a by the return beam LB2 reflected by each of the aforementioned mirrors 6a' to 6q' is taken on the axis of ordinates, whereas the position (mm) of the mirror reflecting the laser beam when the spot diameter is calculated is taken on the axis of abscissas, and a line obtained by plotting the spot diameter corresponding to the layout position of each mirror and connecting the plots is represented by a solid line L1. In depicting the position of the mirror, the position of the mirror 6i preset so that the focal point P is formed on the imaging element 33a is taken as a reference point (0), and there is adopted such a definition that the mirror position on the side where the focal point P is formed on the lower side (see FIG. 2) of the imaging element 33a takes a negative value, while the mirror position on the side where the focal point P is formed on the upper side of the imaging element 33a takes a positive value. Here, in FIG. 4, there is also depicted a dotted line L2 obtained by assuming the value of the spot diameter of the spot formed when an ideal Gaussian beam is applied from the laser oscillator 30 and connecting the relevant plots. In the case where the laser beam oscillated from the laser oscillator 30 of the present embodiment is assumed to be a Gaussian beam and the applied laser beam is converged to the diffraction limit, the spot diameter d0 is 42.00 μm, as indicated by a point P0 where the spot diameter is the smallest on the dotted line L2. On the other hand, the spot diameter d actually measured when the laser beam oscillated from the laser oscillator 30 is converged to the diffraction limit is 50.00 μm, as indicated by a point P1 in the diagram. Based on the spot diameters indicated by these points P0 and P1, the M2 factor is calculated.

Note that a general M2 factor can be obtained according to the formula: $M2 = \theta \cdot d / \theta 0 \cdot d0$ ($\theta 0$ is the spread angle of an ideal Gaussian beam, and $\theta$ is the spread angle of the laser beam which is actually measured). In the case where the difference between $\theta$ and $\theta 0$ is small, it is possible to presume that $\theta/\theta 0 \approx 1$, and to calculate M2 as $M2 = d/d0$. In the case where $\theta$ cannot be regarded as $\theta 0$, it is sufficient to determine the angles $\theta$ and $\theta 0$ and put them into the above formula for obtaining the M2 factor. From the foregoing, it is understood that as the value of the M2 factor is closer to 1 (one), the quality of the laser beam oscillated from the laser oscillator 30 is evaluated to be higher.

In the present embodiment configured based on the present invention, as aforementioned, the plurality of mirrors for reflecting the applied laser beam to change the position of the focal point are disposed in the rotary body, and the rotary body is rotated by the drive source, whereby the spot shapes of the beam spots in the vicinity of the focal point can be easily imaged in a short time, and the picked-up images can be displayed on a display apparatus. Then, based on the spot shapes thus detected, the laser oscillator can be easily evaluated.

The present invention is not limited to the aforementioned embodiment, and various modifications can be conceived so long as they fall within the technical scope of the present invention. While the spot diameter is calculated from the spot shape imaged by the imaging means 33 and the M2 factor is obtained therefrom to evaluate the laser beam in the above-described embodiment, obtaining the M2 factor is not restrictive. Instead of calculating the M2 factor, observation of the spot shapes displayed on the display means m may be used to evaluate the quality of the laser beam. In that case, evaluation of the laser beam can be carried out based on the shape of the spot formed when the laser beam is an ideal laser beam.

While the rotary wheel 91 is disposed on the rotary shaft 8 of the motor 7 in the encoder 9 in the present embodiment, this is not limitative, and the rotary wheel 91 may be disposed on the rotary shaft 5 of the mirror holder 6. Further, while the spot diameter is calculated by D4σ in the present embodiment, this is not restrictive, and the spot diameter may be calculated according to other beam diameter definitions (10/90, 20/80 knife edge, $1/e^2$, D86, etc.) which are generally used.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A spot shape detection apparatus for detecting a spot shape of a laser beam oscillated by a laser oscillator, the spot shape detection apparatus comprising:
   a focusing lens for focusing the laser beam oscillated by the laser oscillator;
   a rotary body in which a plurality of mirrors for reflecting the laser beam having passed through the focusing lens are disposed on concentric circles;
   a drive source for rotating the rotary body at a predetermined period;
   a beam splitter for branching return beams of the laser beam reflected by the plurality of mirrors of the rotary body;
   an imaging unit which is disposed in a direction in which the return beams are branched by the beam splitter and which images spot shapes of the return beams; and
   a display unit for displaying images obtained by imaging by the imaging unit, in relation with the plurality of mirrors,
   wherein the plurality of mirrors are disposed in the rotary body in such a manner that when the rotary body is rotated in a predetermined direction, focal points of the return beams of the laser beam reflected sequentially by the plurality of mirrors gradually approach an imaging position of the imaging unit, reach the imaging position and gradually come farther from the imaging position.

2. The spot shape detection apparatus according to claim 1, wherein a shutter of the imaging unit is opened synchronously with the timing at which the laser beam is incident on each of the mirrors of the rotary body.

3. The spot shape detection apparatus according to claim 2, wherein the brightness of the return beam of the laser beam captured by the imaging unit is controlled by regulating the timing of opening of the shutter of the imaging unit, in a condition where the time when the laser beam is being applied to and reflected by each mirror is the longest.

4. The spot shape detection apparatus according to claim 1, wherein an attenuating filter is disposed in front of the focusing lens.

* * * * *